United States Patent [19]
Bradshaw

[11] 3,802,873
[45] Apr. 9, 1974

[54] PROCESS FOR SEPARATING NOBLE METAL VALUES FROM COMPLEX GRAPHITIC ORES

[75] Inventor: Richard J. Bradshaw, Phoenix, Ariz.

[73] Assignee: New Era Unlimited, Inc., Phoenix, Ariz.

[22] Filed: Dec. 22, 1972

[21] Appl. No.: 317,736

[52] U.S. Cl.......................... 75/118, 75/83, 75/113, 75/121
[51] Int. Cl............................................. C22b 11/06
[58] Field of Search......... 75/83, 111, 113, 118, 121

[56] References Cited
UNITED STATES PATENTS

| | | | |
|---|---|---|---|
| 501,559 | 7/1893 | Chanute | 75/113 |
| 1,341,686 | 6/1920 | Thayer | 75/83 |
| 696,469 | 4/1902 | McKnight | 75/83 |
| 1,184,456 | 5/1916 | James | 75/118 |
| 3,150,960 | 9/1964 | Hunter | 75/118 |
| 3,238,038 | 3/1966 | Hunter | 75/118 |
| 3,574,600 | 4/1971 | Scheiner et al. | 75/118 |

Primary Examiner—L. Dewayne Rutledge
Assistant Examiner—M. J. Andrews
Attorney, Agent, or Firm—William H. Drummond

[57] ABSTRACT

Noble metal values are extracted from complex graphitic ores by heating the comminuted ore to a temperature of approximately 600° F for approximately 1 hour to thermally transform the graphite inclusions from the naturally occurring graphite "scale" macrostructure to a foliated macrostructure, thus exposing noble metal values normally occluded in the graphite. The foliated graphite is then treated with a chloridizing reagent to convert the noble metal values to the corresponding noble metal chlorides. Gold chloride and other chlorides of the metals of the light platinum triad and heavy platinum triad are separated from the reaction mixture by heating to a temperature at least above their respective vaporization temperatures to separate these chlorides from the gangue material containing unvaporized silver chloride. The gangue material containing unvaporized silver chloride is smelted with a flux to convert the silver chloride to metallic silver. The vaporized chlorides are dissolved in water and treated to selectively separate and reduce the noble metal chlorides to the respective noble metals.

1 Claim, 2 Drawing Figures

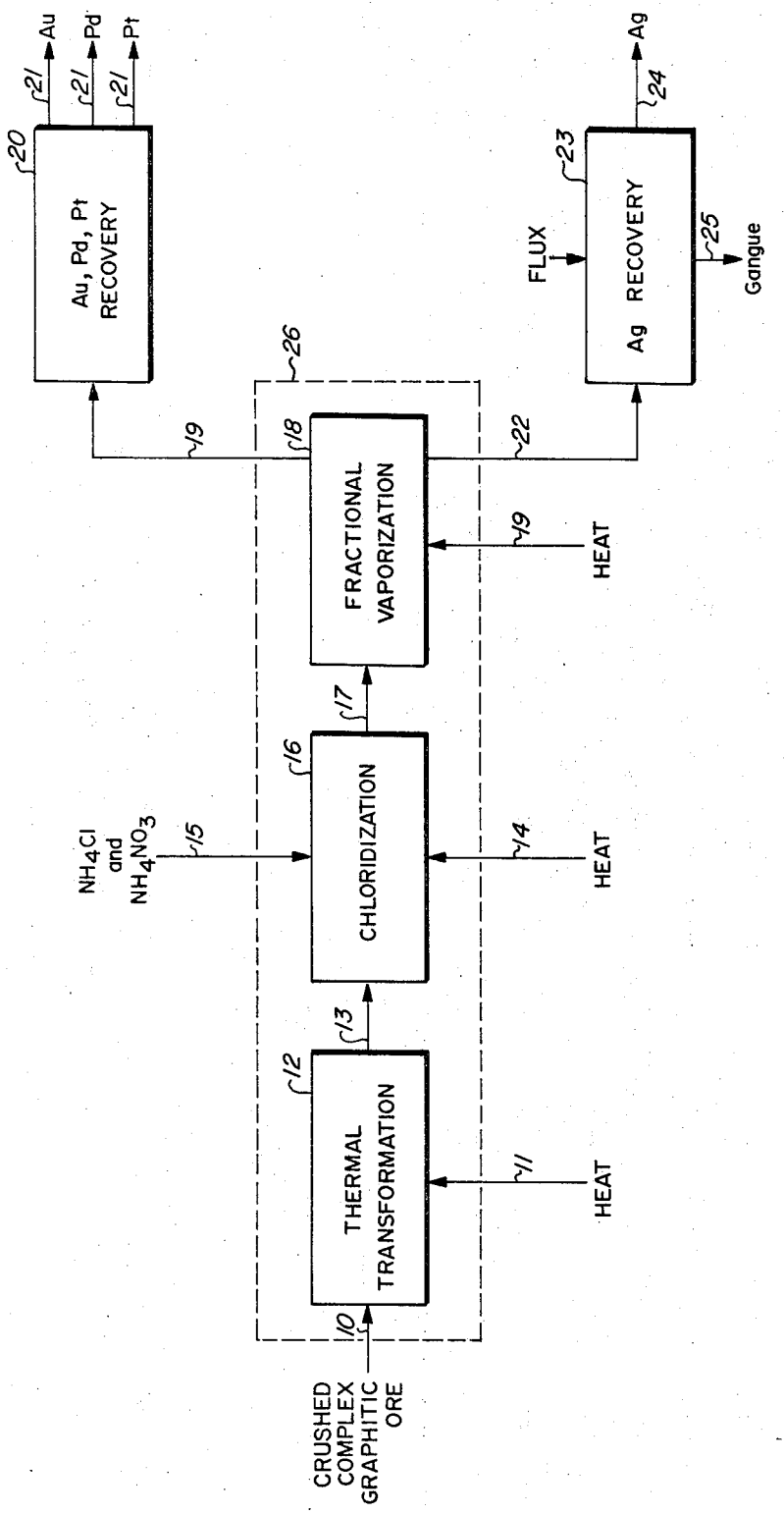

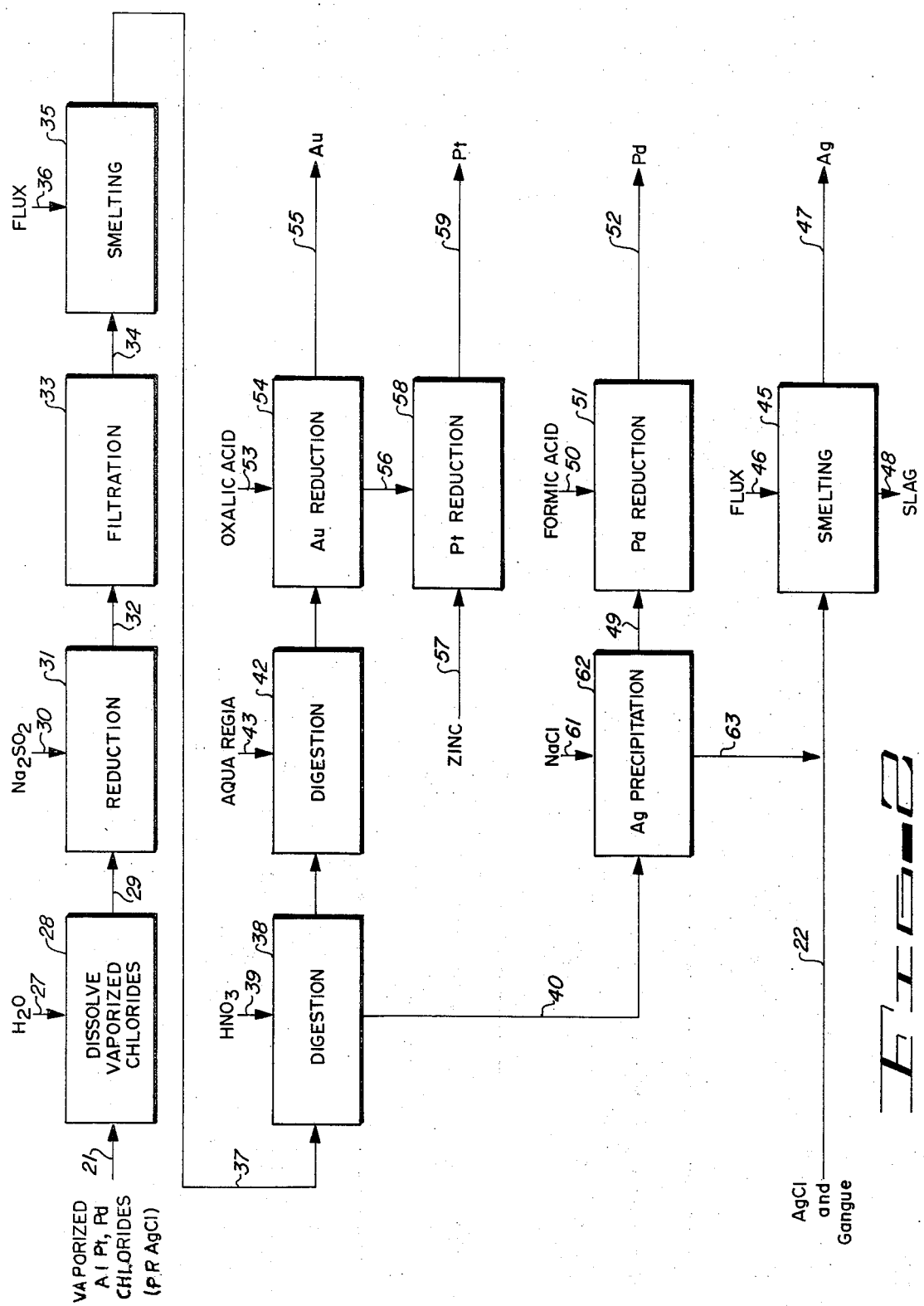

PROCESS FOR SEPARATING NOBLE METAL VALUES FROM COMPLEX GRAPHITIC ORES

This invention relates to process for refining graphitic ores.

More particularly, the invention concerns a process for separating noble metal values from complex graphitic ores in which graphite inclusions, distributed in the gangue material, comprise a closed macrostructure of graphite scales having noble metal values occluded therein.

In a further important respect, the invention relates to a process for refining graphitic ores which are not amenable to refining by conventional smelting or hydrometallurgical techniques.

In a further aspect, the invention pertains to the separation of noble metals such as gold, silver and the metals of the light platinum triad and the heavy platinum triad from graphitic ores.

Naturally occurring graphite occurs in a variety of rocks, gneisses and schists, as well as in granites and other igneous rocks. In certain rocks, throughout the world, these graphitic ores also contain significant quantities of noble metals, particularly gold, silver, platinum and palladium.

To date, such complex graphitic ores have not been amenable to refining by conventional techniques to recover these noble metals. The noble metal values in graphitic ores are present in the native metallic form or as various noble metal compounds and are occluded within the graphitic scale structure. Because the metal values are occluded, it is virtually impossible to recover the metal values by treating the ores with conventional hydro-metallurgical extraction reagents or by conventional pyro-metallurgical smelting techniques.

I have now discovered an economically feasible process for separating noble metal values from such complex graphitic ores. The process is applicable to virtually any graphitic ore in which the graphite inclusions comprise a closed macrostructure of graphite scales in which the noble metal values are occluded.

As used herein, the term "noble metal" is intended to include gold, silver and the metals of the light platinum triad and heavy platinum triad, i.e., ruthenium, rhodium, palladium, osmium, iridium and platinum. As a class, these "noble metals" are comparatively unreactive under normal conditions but can be converted to their respective chlorides at elevated temperatures by reaction with alkali metal or ammonium chlorides in the presence of alkali metal or ammonium nitrates.

My process includes as an important step the thermal transformation of the naturally occurring graphite scale structure to a foliated macrostructure so as to expose the noble metal occlusions to treatment with the chloridizing reagent mixture.

Briefly, in accordance with the invention, I provide a process for separating noble metal values from complex graphitic ores as described above including the steps of comminuting the ore to expose the graphite inclusions, heating the comminuted ore to a temperature at least above 600° F. for a time sufficient to thermally transform the graphite inclusions to the desired foliated macrostructure, continuing the heating of the ore in the presence of a chloridizing reagent for the noble metal values to convert the noble metal values to their respective corresponding chlorides, separating the gold chlorides and chlorides of the light platinum triad and heavy platinum triad from the chloridizing reaction mixture by continuing to heat the mixture at a temperature at least above 600° F to vaporize and separate these chlorides from the gangue material which contains unvaporized silver chloride, smelting the gangue material with a flux to convert the silver chloride to metallic silver, dissolving the vaporized chlorides in water to form an aqueous solution thereof, and treating the aqueous solution to selectively separate and reduce the noble metal chlorides to the respective noble metals.

The process of the invention is illustrated in the drawings, in which:

FIG. 1 is a flow sheet illustrating the thermal transformation and chloridization of the graphitic ore and the fractional vaporization of the chloridized ore to separate the noble metals as their respective chlorides in subsequent recovery and refining steps; and FIG. 2 illustrates in greater detail the recovery and refining techniques which are employed to convert the noble metal chlorides to the respective elemental noble metals.

Referring to the drawings, the complex graphitic ore is first crushed by conventional techniques to expose the graphite inclusions. Typically, this will require that the ore be crushed to about minus 200 mesh. The crushed ore 10 is then placed in a suitable refractory vessel and heat 11 is supplied to carry out a thermal transformation step 12. The purpose of the thermal transformation step 12 is to "open" the normal closed scale macrostructure of the graphite to a foliated macrostructure which exposes the noble metal value occlusions. The thermally transformed graphite inclusions 13 are then further heated 14, conveniently in the same refractory vessel in the presence of a chloridizing reagent 15. The preferred chloridizing reagent is an equimolar mixture of an alkali metal or ammonium chloride with an alkali metal or ammonium nitrate. Because of process economics and other practical considerations, I prefer to employ an equimolar mixture of ammonium chloride and ammonium nitrate. As the chloridization reaction 16 proceeds, the noble metal chlorides 17 are fractionally vaporized 18 at a temperature of approximately 600° F, at which temperature the gold chloride and the chlorides of the platinum triad metals are vaporized 19. The unvaporized silver chloride (boiling point = 2,822° F) remains in the gangue material. The vaporized chlorides 19 of gold, palladium, platinum, etc. are subjected to conventional recovery and refining procedures 20 to yield the pure metallic noble metals 21. The unvaporized silver chloride and gangue material 22 is treated by conventional smelting techniques 23 to separate the pure silver metal 24 from the gangue material 25 which is discarded.

For clarity of illustration, FIG. 1 separately indicates the thermal transformation step 12, the chloridization step 16 and the fractional vaporization step 18. However, as indicated by the dashed line 26, these steps are preferably carried out substantially simultaneously in the same refractory reaction vessel.

Referring now to FIG. 2, the vaporized noble metal chlorides 21 which may contain a trace of silver chloride are contacted with water 27, preferably by passing the vaporized metals through a water scrubbing tower, to dissolve the vaporized chlorides 28. At this point, those skilled in the art will recognize that the resulting aqueous solution of the noble metal chlorides 29 can be treated by any one of a variety of techniques well known in the art to separate and recover the noble metals. Accordingly, the remainder of this description of FIG. 2 is presented only for illustrative purposes and to identify the presently preferred embodiment of the invention.

According to the presently preferred embodiment of the invention, the noble metal chloride solution 29 is treated with sodium sulfite 30 to accomplish a reduction 34 of the chlorides yielding a precipitation mixture 32 which is subjected to a filtration step 33. The filter cake 34 is then smelted 35 with a flux 36 yielding a purified noble metal amalgam 37.

A wide variety of fluxes can be employed in the smelting step 35 depending on the specific nature of the impurities present in the filter cake 34. For example, I preferably employ a flux composed of equal parts of soda ash, powdered charcoal and sodium tetraborate. The composition of the flux 36 and the specific smelting techniques employed are those conventionally employed in typical assay procedures and need not be further identified as those skilled in the art will readily understand and be able to practice such procedures without undue experimentation.

The resulting noble metal amalgam 37 is preferably subjected to a digestion step 38 with nitric acid 39 yielding a pregnant liquor 40 of the silver and palladium values. The residue 41 from the digestion step 38 is subjected to a second digestion step 42 with aqua regia 43 yielding a pregnant liquor 44 containing the gold and platinum values.

The pregnant liquor 40 is treated with a suitable silver precipitant such as sodium chloride 61 to precipitate 62 the silver values 63. The precipitated silver values 63 are combined with the silver chloride-gangue residue 22 from the fractional vaporization step (step 18, FIG. 1) and subjected to conventional smelting 45 with an appropriate flux 46 to separate the metallic silver product 47 from the slag 48. The pregnant liquor 49 from the silver precipitation step 43 is treated with an appropriate reducing agent such as formic acid 50 to reduce the palladium values 51 yielding the metallic palladium product 52.

The pregnant liquor 44 from the aqua regia digestion step 42 is treated with a suitable gold reducing agent such as oxalic acid 53 to reduce the gold values 54 yielding the metallic gold product 55. The pregnant liquor 56 from the gold reduction step 54 is treated with a suitable platinum reduction agent such as zinc 57 to reduce the platinum values 58 yielding the metallic platinum product 59.

EXAMPLE

The following illustrative example is presented to further clarify the nature of the invention and to further identify the presently preferred embodiment thereof.

One ton of a graphitic schist ore mined in Llano County, Tex., is ground in a ball mill to −200 mesh and uniformly mixed in the mill with 1,000 pounds of ammonium chloride and 1,000 pounds of ammonium nitrate. The resulting mixture is calcined for one hour in a refractory crucible heated to maintain the mixture at 600°F. During the calcining step, the vaporized components of the mixture are collected in an insulated fume collector located above the crucible and drawn therefrom by means of a water-powered eductor through an insulated duct to a water spray tower through which 200 gallons of water is continuously recirculted.

At the termination of the calcining step, the gangue material and unvaporized silver chloride is cooled and again ground to −200 mesh. The ground gangue and sodium chloride is then fed to a gas-fired reverberatory furnace and smelted for one hour with 250 pounds of a flux composed of equal parts by weight of soda ash powdered charcoal, sodium tetraborate and petroleum coke. The metallic silver product is subcanted from the reverberatory furnace and the slag is discarded.

The vaporized noble metal halides, dissolved in the 200 gallons of water circulated in the spray tower, is mixed with 100 pounds of sodium sulfite in a stirred reaction vessel and stirring is continued for 30 minutes, producing a slurry of precipitated noble metal slimes. The slimes are separated from the precipitation mixture by filtration and smelted with the same smelting flux for one hour at 2,300°F. The resulting noble metal amalgam is subcanted from the smelting furnace and the slag is discarded.

The noble metal amalgam is successively digested with nitric acid and aqua regia. The pregnant liquor from the nitric acid digestion step is treated with sodium chloride to precipitate silver chloride which is combined with the silver chloride — gangue mixture from the calcining step for recovery of the silver metal product. The mother liquor from the silver precipitation step is mixed with formic acid, causing palladium values to precipitate as a palladium metal sponge product.

The pregnant liquor from the aqua regia digestion step is first reacted with oxalic acid to precipitate the gold values which are separated from the mother liquor as a metallic gold product. The mother liquor is then agitated with powdered zinc to reduce the platinum values, yielding a platinum metal product.

Having described my invention in such clear terms as to enable those skilled in the art to understand and practice it, and having identified the presently preferred embodiment thereof, I Claim:

1. A process for separating noble metal values from a complex graphitic ore, said ore comprising graphite inclusions distributed in a gangue material, said graphite inclusions comprising a closed macrostructure of graphite scales having occluded therein noble metal values consisting of metals and compounds thereof of the light platinum triad, heavy platinum triad, gold and silver, said process comprising the steps of:
 a. comminuting said ore to expose said graphite inclusions;
 b. heating said comminuted ore to a temperature at least above 600°F for a time sufficient to thermally transform said graphite inclusions to a foliated macrostructure, exposing said noble metal value occlusions;
 c. forming a chloridizing reaction mixture by heating said foliated graphite inclusions in intimate admixture with a chloridizing reagent for said noble metal values, said chloridizing reagent comprising ammonium chloride and ammonium nitrate to convert said noble metal values to the corresponding noble metal chlorides;
 d. separating gold chloride and chlorides of the metals of the light platinum triad and heavy platinum triad from said chloridizing reaction mixture by heating said mixture to a temperature at least above 600°F to separate said chlorides from the gangue material containing unvaporized silver chloride;

e. smelting said gangue material containing unvaporized silver chloride with a flux to convert said silver chloride to metallic silver and separating said metallic silver from the smelting mixture;

f. dissolving said vaporized chlorides in water to form an aqueous solution thereof; and g. treating said aqueous solution to selectively separate and reduce said noble metal chlorides to the respective noble metals.

* * * * *